US011934738B2

(12) United States Patent
Ohkuma et al.

(10) Patent No.: US 11,934,738 B2
(45) Date of Patent: Mar. 19, 2024

(54) ACOUSTIC DEVICE AND MUSIC PIECE REPRODUCTION PROGRAM

(71) Applicant: AlphaTheta Corporation, Yokohama (JP)

(72) Inventors: Takahisa Ohkuma, Yokohama (JP); Yohei Habu, Yokohama (JP); Masamichi Tomii, Yokohama (JP); Tetsuro Abe, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 259 days.

(21) Appl. No.: 17/610,796

(22) PCT Filed: May 14, 2019

(86) PCT No.: PCT/JP2019/019167
§ 371 (c)(1),
(2) Date: Nov. 12, 2021

(87) PCT Pub. No.: WO2020/230271
PCT Pub. Date: Nov. 19, 2020

(65) Prior Publication Data
US 2022/0206740 A1 Jun. 30, 2022

(51) Int. Cl.
*G06F 3/16* (2006.01)
*G10H 1/00* (2006.01)
(52) U.S. Cl.
CPC .......... *G06F 3/165* (2013.01); *G10H 1/0008* (2013.01); *G10H 2240/325* (2013.01)
(58) Field of Classification Search
None
See application file for complete search history.

(56) References Cited

U.S. PATENT DOCUMENTS 4,300,225 A * 11/1981 Lambl .................. G11B 31/00
369/2
6,538,190 B1 * 3/2003 Yamada ............... G11B 27/002
84/DIG. 12

(Continued)

FOREIGN PATENT DOCUMENTS

JP 2001-52441 2/2001
JP 2003-108132 4/2003
(Continued)

OTHER PUBLICATIONS

English translation of the International Preliminary Report on Patentability dated Nov. 16, 2021, Application No. PCT/JP2019/019167; 6 pages.

(Continued)

*Primary Examiner* — Hemant S Patel
(74) *Attorney, Agent, or Firm* — Rankin, Hill & Clark LLP (57) ABSTRACT

An acoustic device includes: a music player that is capable of simultaneously playing a plurality of music pieces of which music piece data includes specific playback positions set therefor; a playback speed adjusting section configured to adjust a playback speed of each of the music pieces; a music piece switching section configured to execute switching from a first music piece being played by the music player to a second music piece; and a playback position adjusting section configured to execute adjustment such that the specific playback position of the second music piece is aligned on a time axis with the specific playback position of the first music piece being played at a playback speed adjusted by the playback speed adjusting section.

6 Claims, 6 Drawing Sheets

(56) References Cited

U.S. PATENT DOCUMENTS

| | | | | |
|---|---|---|---|---|
| 11,416,208 B2* | 8/2022 | Zheng | ................... | G06F 3/165 |
| 2004/0254660 A1* | 12/2004 | Seefeldt | ................. | G10H 1/40 |
| | | | | 700/94 |
| 2013/0282388 A1 | 10/2013 | Engdegard | | |
| 2020/0133628 A1* | 4/2020 | Zalon | ................... | G05B 15/02 |

FOREIGN PATENT DOCUMENTS

| | | |
|---|---|---|
| JP | 2003-228963 | 8/2003 |
| JP | 2008-164932 A | 7/2008 |
| JP | 2012-128928 A | 7/2012 |

OTHER PUBLICATIONS

Japanese Office Action dated Oct. 4, 2022, Application No. 2021-519104; English translation included, 6 pages.
International Search Report dated Jul. 2, 2019, Application No. PCT/JP2019/019167, 2 pages.
Japanese Office Action dated Mar. 28, 2023, Application No. 2021-519104; English translation included, 4 pages.

* cited by examiner

ACOUSTIC DEVICE AND MUSIC PIECE REPRODUCTION PROGRAM

TECHNICAL FIELD

The present invention relates to an acoustic device and a music piece playback program.

BACKGROUND ART

An acoustic device such as a DJ controller and a computer for running a music piece playback program such as Digital Audio Workstation (DAW) can simultaneously play a plurality of music pieces. In a playback method of these acoustic devices, an operator (performer) can switch a music piece being played to another music piece.

Switching from a music piece being played to another music piece needs a high level of DJ skill, because adjustment of a playback speed (BPM) and switching from a musical structure change position of the music piece being played to a musical structure change position of another music piece should be performed smoothly or naturally.

In view of the above, Patent Literature 1 discloses a technique as follows. A mean of tempo information (i.e., different playback speeds) of audio programs input to be combined into one is calculated; section positions at which each input audio program is sectioned into phrases are generated; and the audio programs of which tempo information is converted into the mean are combined into one based on the section positions of the audio programs.

According to the technique of Patent Literature 1, it is possible to combine the entirety or part of a plurality of music pieces with each other at a tempo aligned.

CITATION LIST

Patent Literature(s)

Patent Literature 1: JP 2003-228963 A

SUMMARY OF THE INVENTION

Problem(s) to be Solved by the Invention

However, in the technique described in Patent Literature 1, when a music piece is switched to another music piece, unnaturalness due to the change in playback speed (BPM) is eliminated but no musical structure change position of the music pieces is considered. Since the musical structure change position of the music piece being played and the musical structure change position of the music piece subjected to the switching remain inappropriate, listeners may feel uncomfortable.

An object of the invention is to provide an acoustic device and a music piece playback program capable of switching a music piece being played to another music piece naturally and smoothly without any need for a high level of DJ skill.

Means for Solving the Problem(s)

An acoustic device of the invention includes: a music player configured to simultaneously play a plurality of music pieces of which music piece data include specific playback positions set therefor, the music pieces including a first music piece and a second music piece; a playback speed adjusting section configured to adjust a playback speed of each of the music pieces; a music piece switching section configured to execute switching from the first music piece being played by the music player to the second music piece; and a playback position adjusting section configured to execute adjustment such that the specific playback position of the second music piece is aligned on a time axis with the specific playback position of the first music piece being played at a playback speed adjusted by the playback speed adjusting section.

A computer-readable music piece playback program of the invention is configured to cause a computer to function as the acoustic device described above.

DESCRIPTION OF EMBODIMENT(S)

Figure 1:
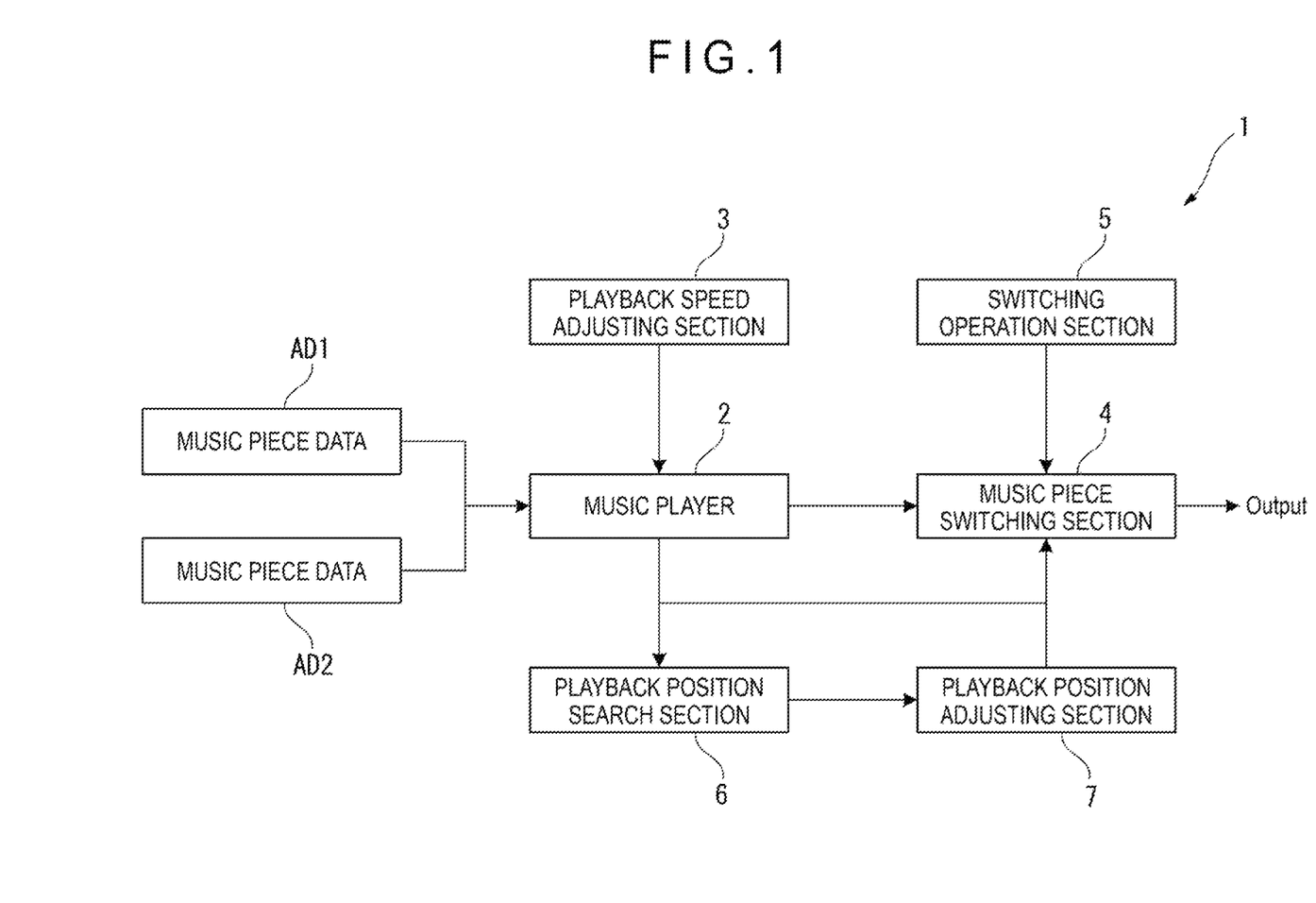
FIG. 1 is a block diagram showing a structure of an acoustic device according to a first exemplary embodiment of the invention.

FIG. 1 shows an acoustic device 1 according to a first exemplary embodiment of the invention. The acoustic device 1 can simultaneously play a plurality of music pieces whose music piece data include specific playback positions set therefor. Examples of the acoustic device 1 include a computer provided with a CPU and a storage, a communication-connectable mobile terminal, and a dedicated acoustic device such as a DJ controller.

The acoustic device 1 includes a music player 2, a playback speed adjusting section 3, a music piece switching section 4, a switching operation section 5, a playback position search section 6, and a playback position adjusting section 7. Those components are configured as a computer-readable music piece playback program run on a computer.

The music player 2 can simultaneously play music piece data AD1, AD2 input thereto. Although the music player 2 can simultaneously play the music piece data AD1, AD2, the second music piece data AD2 may be stopped while the first music piece data AD1 is played.

Specific playback positions are set for the music piece data AD1, AD2 input to the music player 2. A bar position or a musical structure change position where a musical structure of the music piece is changed may be set as the specific playback position. Examples of the musical structure include introduction, 1st verse, chorus, and ending (Outro). In the exemplary embodiment, a case where the musical structure change position is set as the specific playback position is explained.

The musical structure change position of the music piece data can be obtained by executing, together with the input of the music piece data, a music piece spectrum analysis such as Fast Fourier Transform (FFT). The musical structure change position, which is a result of the music piece spectrum analysis, may be obtained by executing the analysis on the computer described above together with the input of the music piece data. Alternatively, the musical structure change position may be obtained from music piece data to which the result of the music piece spectrum analysis is added in advance.

Further, the music player 2 may read and play the music piece data AD1, AD2 stored in a storage of the acoustic device 1. Alternatively, the music player 2 may play streaming data supplied via the Internet (not shown).

The playback speed adjusting section 3 adjusts playback speeds of the music piece data AD1, AD2 played by the music player 2. Specifically, the playback speed adjusting section 3 displays Beats Per Minutes (BPM) of the music piece data AD1, AD2 and a BPM adjustment switch on a display screen of the computer to induce an operator to perform an operation for adjusting the BPM of the music piece data AD1, AD2.

The music piece switching section 4 executes the switching of the music piece data AD1, AD2 to be played by the music player 2. Specifically, the music piece switching section 4 switches the first music piece being played by the music player 2 based on the music piece data AD1 to the second music piece to be played based on the music piece data AD2 being played or stopped, and outputs the second music piece.

Although the music piece switching section 4 may automatically execute the switching from the first music piece to a second music piece, an operator preferably performs the switching by operating the switching operation section 5 in order to actually feel that he/she is giving the DJ performance.

The switching operation section 5 is configured as a cross fader used in a DJ controller or the like. The cross fader is displayed, as graphics, on a display screen of the computer. When an operation unit of the cross fader as the switching operation section 5 is at an end position of the first music piece, the switching operation section 5 outputs audio of only the first music piece. Audio output of the second music piece increases as the operation unit moves toward an end position of the second music piece. Audio of only the second music piece is output when the operation unit is at the end position of the second music piece. The music piece switching section 4 adjusts an output ratio between output of the first music piece and output of the second music piece depending on the position of the operation unit of the switching operation section 5 and executes audio output.

The playback position search section 6 searches closest specific playback positions of the music piece data AD1, AD2 to be played by the music player 2.

Figure 2:
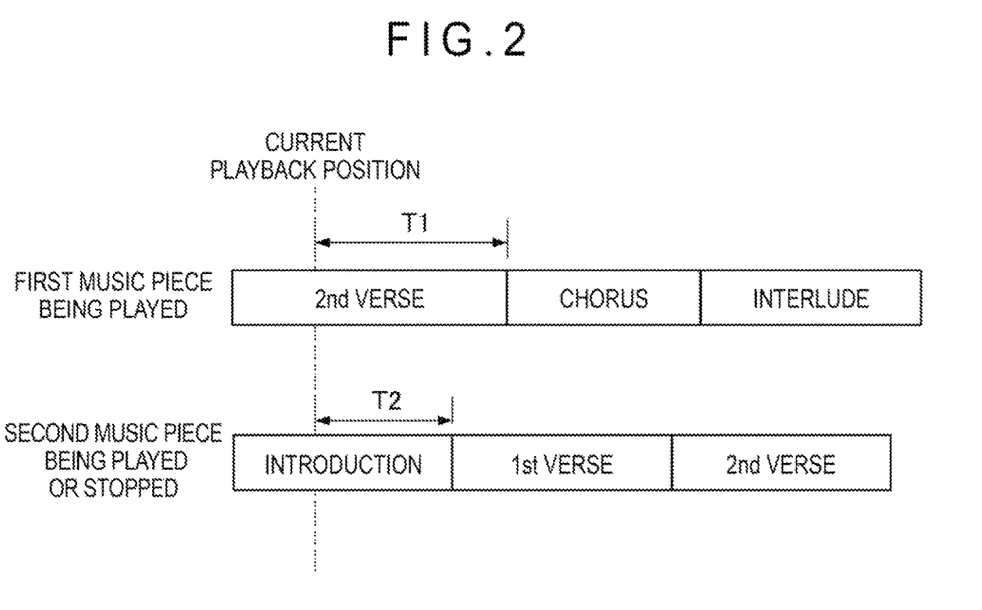
FIG. 2 schematically shows musical structure change positions of a first music piece and a second music piece according to the first exemplary embodiment.

Specifically, as shown in FIG. 2, the playback position search section 6 searches a musical structure change position closest on a time axis to a current playback position of the music piece data AD1 (i.e., a musical structure change position at which the musical structure is changed from 2nd verse to chorus) as a musical structure change position that comes T1 second(s) after the current playback position. Along with the above, the playback position search section 6 searches a musical structure change position that comes T2 second(s) after a current playback position of the second music piece.

The playback position search section 6 outputs, to the playback position adjusting section 7, the time T1 from the current playback position to the musical structure change position of the first music piece being played. Similarly, the playback position search section 6 outputs, to the playback position adjusting section 7, the time T2 from the current playback position to the musical structure change position of the second music piece.

The playback position adjusting section 7 executes adjustment such that the musical structure change position of the second music piece is aligned on a time axis with the musical structure change position of the first music piece depending on the search results by the playback position search section 6.

Figure 3:
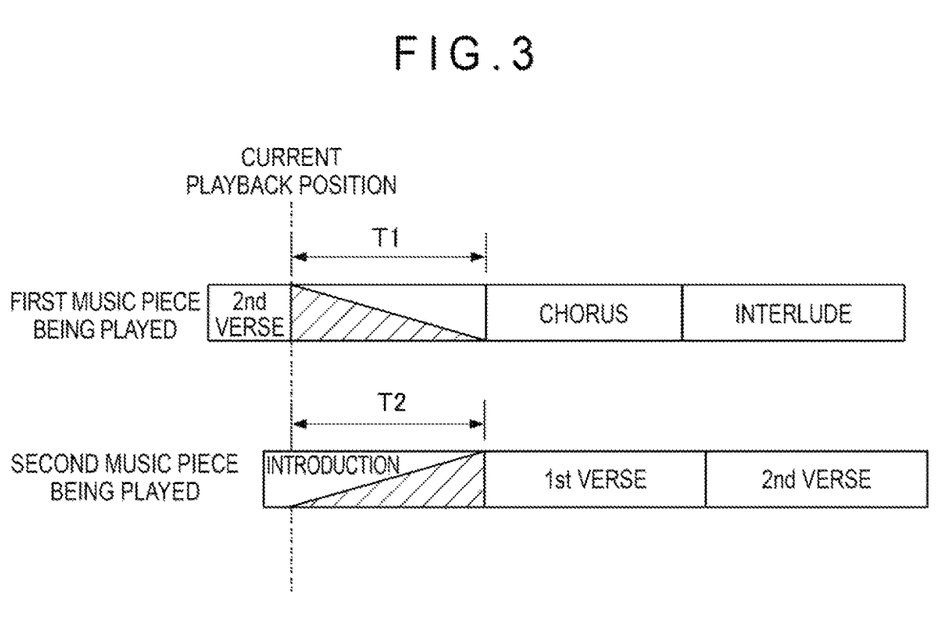
FIG. 3 schematically shows a state where adjustment for aligning a musical structure change position of the second music piece with a musical structure change position of the first music piece is executed according to the first exemplary embodiment.

Specifically, when T1>T2 is satisfied, the playback position adjusting section 7 executes adjustment for aligning the musical structure change position of the second music piece (1st verse start position in FIG. 3) with the musical structure change position of the first music piece (chorus start position in FIG. 3) to meet T1=T2, as shown in FIG. 3.

As shown in FIG. 3, the switching from the first music piece to the second music piece is performed by an operator moving the operation unit of the switching operation section 5 from a position indicating the first music piece to a position indicating the second music piece. The operator's operation performed on the switching operation section 5 gradually decreases output of the first music piece and gradually increases output of the second music piece.

When the searched musical structure change position has come, the music piece switching section 4 stops the playback of the first music piece and outputs only the second music piece.

Next, workings of the exemplary embodiment are described below with reference to a flowchart of FIG. 4.

The music piece switching section 4 monitors an operation state of the switching operation section 5 (Step S1).

When it is determined that the switching operation section 5 is operated, this determination is output to the playback position search section 6 (Step S1).

The playback position search section 6 searches a musical structure change position closest to a current playback position of the first music piece being played (Step S2).

Subsequently, the playback position search section 6 searches a musical structure change position closest on a time axis to a current playback position of the second music piece (Step S3).

The playback position adjusting section 7 executes adjustment such that the musical structure change position of the second music piece searched by the playback position search section 6 is aligned on a time axis with the musical structure change position of the first music piece searched by the playback position search section 6 (Step S4).

The exemplary embodiment achieves the following effects.

In the exemplary embodiment, the switching of the first music piece and the second music piece at a musical structure change position can be executed automatically upon the simple operation performed on the switching operation section 5 by an operator. The switching of music pieces can be thus achieved naturally and smoothly without any need for a high level of DJ skill.

In the exemplary embodiment, the switching from the first music piece to the second music piece is executed at a musical structure change position. The switching of the music pieces can be executed without synchronization of BPM of the first music piece with BPM of the second music piece, eliminating the need for an operator with a high level of DJ skill.

When the first music piece is switched to the second music piece, the output of the respective music pieces is adjustable depending on an operator's operation on the cross feeder. Thus, a higher level of DJ performance can be achieved by adjusting the output of the first music piece and the second music piece during the transition from the first music piece to the second music piece depending on an operator's operation.

Next, description is made on a second exemplary embodiment of the invention. In the description of the second exemplary embodiment, the same components or parts as those in the first exemplary embodiment are denoted by the same reference signs and names to omit an explanation of the components or parts.

Figure 4:
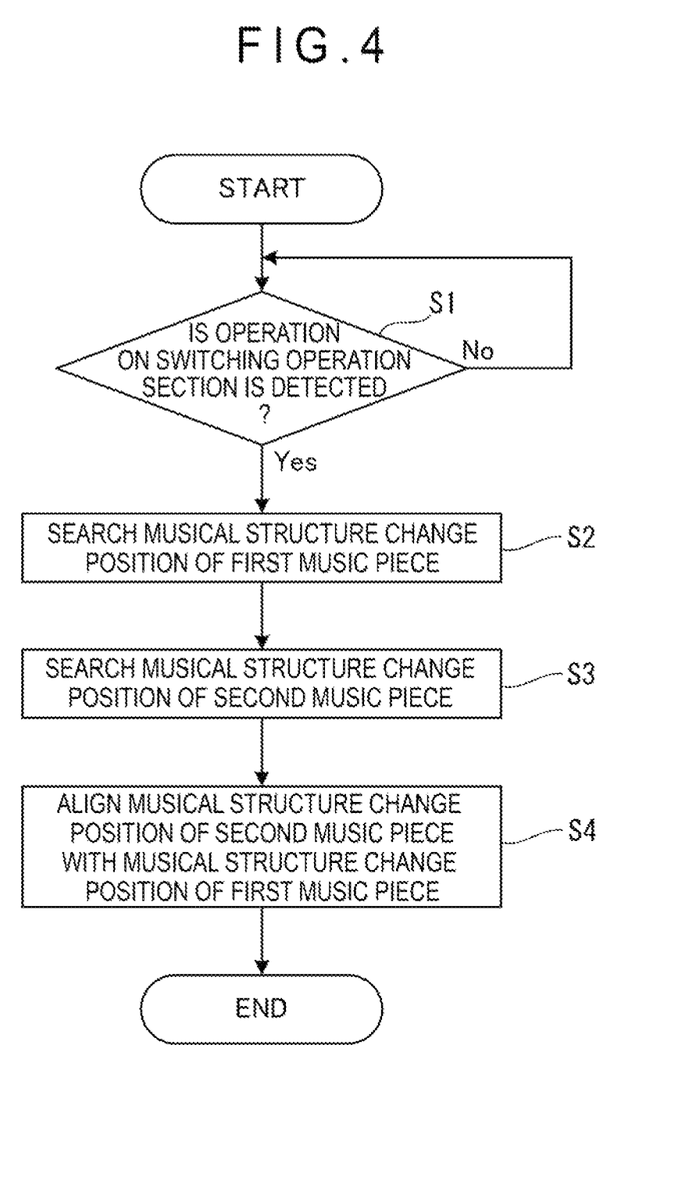
FIG. 4 is a flowchart showing workings of the first exemplary embodiment.

In the first exemplary embodiment, as shown in FIGS. 3 and 4, adjustment is made so that a musical structure change position of the second music piece is aligned on a time axis with a musical structure change position of the first music piece.

Figure 5:
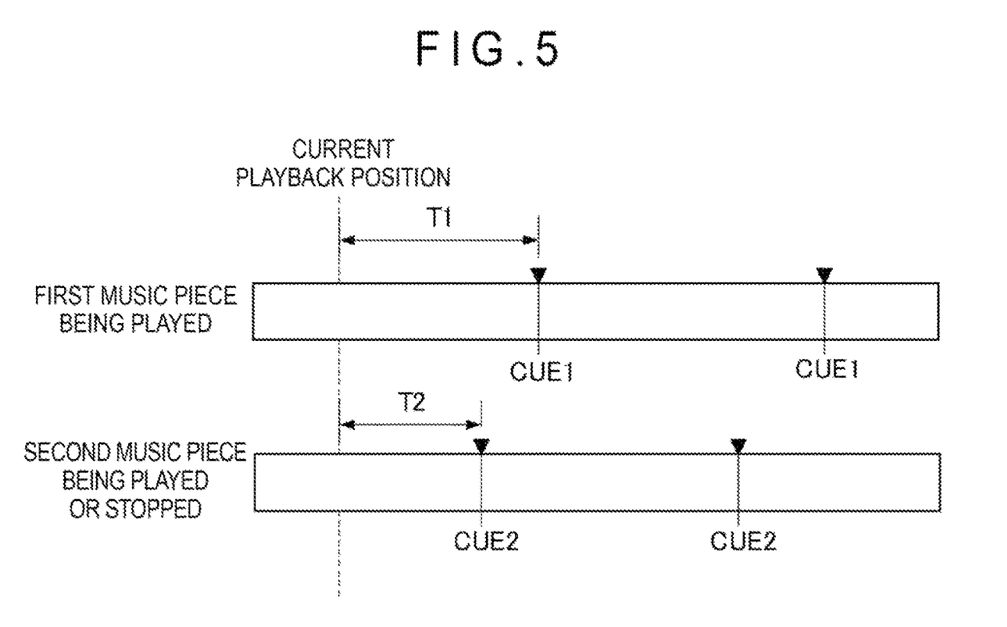
FIG. 5 schematically shows cue points of a first music piece and a second music piece according to a second exemplary embodiment of the invention.
Figure 6:
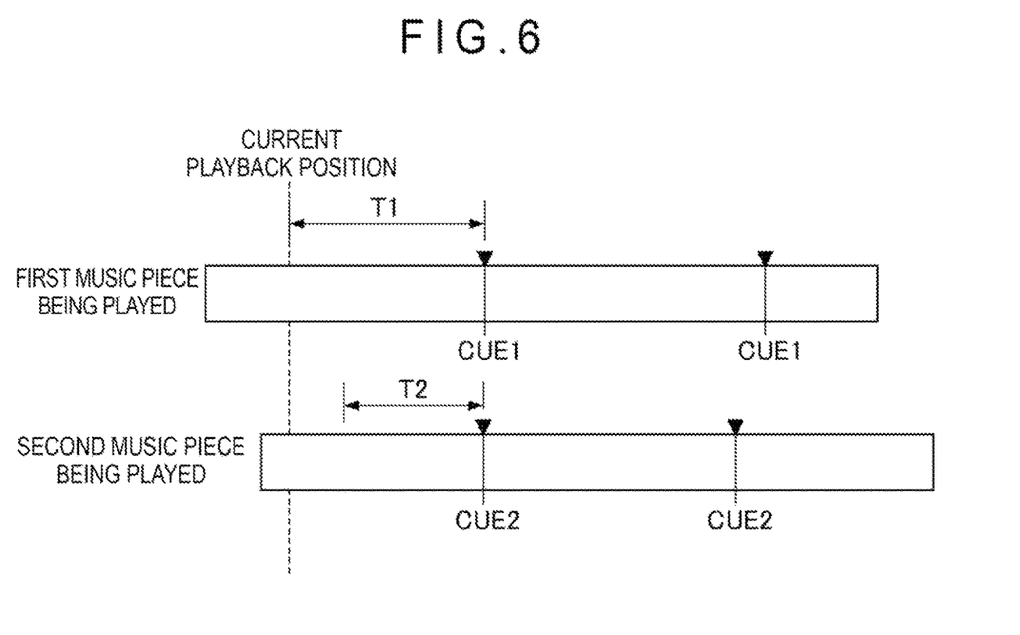
FIG. 6 schematically shows a state where adjustment for aligning a cue point of the second music piece with a cue point of the first music piece is executed according to the second exemplary embodiment.

The second exemplary embodiment is different from the first exemplary embodiment in that a cue point CUE2 set for the second music piece is aligned on a time axis with a cue point CUE1 set for the first music piece, as shown in FIGS. 5 and 6.

The second exemplary embodiment also provides workings and effects similar to those described above.

Further, an operator can freely set the cue point CUE1 for the first music piece and the cue point CUE2 for the second music piece. Thus, the switching from the first music piece to the second music piece can be performed at any point regardless of the musical structure change position of the first music piece, allowing an operator to switch music pieces with a complicated composition without any need for a high level of DJ skill.

It should be noted that the invention is not limited to the above exemplary embodiments, but includes modifications described below.

In the above exemplary embodiments, the invention is applied only to the switching of music pieces, but not limited thereto. The invention is applicable to a DJ performance where the switching of video images or the switching for illumination control is performed along with the switching of the music pieces.

The invention is applied to the music piece playback program run on the computer in the above exemplary embodiments, but not limited thereto. The invention is applicable to a playback instrument dedicated for playing music pieces, music piece playback software, or a dedicated DJ instrument such as a DJ controller.

In addition, regarding a specific structure, shape, etc. for implementation of the invention, any other structure, etc. may be employed as long as an object of the invention is achievable.

The invention claimed is:

1. An acoustic device, comprising:
a music player configured to simultaneously play a plurality of music pieces comprising musical structure change positions set therefor, the music pieces comprising a first music piece and a second music piece;
a playback speed adjusting section configured to adjust a playback speed of each of the plurality of music pieces;
a music piece switching section configured to execute switching from the first music piece being played by the music player to the second music piece; and
a playback position adjusting section configured to execute adjustment such that the musical structure change position of the second music piece is aligned on a time axis with the musical structure change position of the first music piece being played at a playback speed adjusted by the playback speed adjusting section, and a playback position of the second music piece is aligned with a playback position of the first music piece.

2. The acoustic device according to claim 1, further comprising a switching operation section configured to induce an operator to perform switching of the music pieces.

3. The acoustic device according to claim 2, wherein the switching operation section is a cross fader configured to change an output ratio between output of the first music piece being played and output of the second music piece.

4. A non-transitory computer-readable recording medium recording a music piece playback program configured to cause a computer to function as the acoustic device according to claim 1.

5. The acoustic device according to claim 1, wherein the musical structure change positions are positions within the plurality of music pieces where a musical structure is changed.

6. The acoustic device according to claim 1, wherein the musical structure change positions of the plurality of music pieces are positions within the plurality of music pieces where a change between musical structures occurs, the musical structures including at least two of: an introduction; a first verse; a second verse; a chorus; and an ending.

* * * * *